(12) United States Patent
Reuben

(10) Patent No.: US 10,786,099 B2
(45) Date of Patent: *Sep. 29, 2020

(54) COMPOSITE DOWN FEATHER SHEET WITH ELASTIC WEBS

(71) Applicant: Ronie Reuben, Town of Mount Royal (CA)

(72) Inventor: Ronie Reuben, Town of Mount Royal (CA)

( * ) Notice: Subject to any disclaimer, the term of this patent is extended or adjusted under 35 U.S.C. 154(b) by 747 days.

This patent is subject to a terminal disclaimer.

(21) Appl. No.: 15/330,405

(22) Filed: Sep. 16, 2016

(65) Prior Publication Data

US 2017/0071367 A1   Mar. 16, 2017

(30) Foreign Application Priority Data

Sep. 16, 2015   (CA) .................................... 2904672

(51) Int. Cl.
| | | |
|---|---|---|
| *A47G 9/02* | (2006.01) | |
| *D04H 13/00* | (2006.01) | |
| *D06M 19/00* | (2006.01) | |
| *B32B 5/04* | (2006.01) | |
| *B32B 5/06* | (2006.01) | |
| *B32B 9/04* | (2006.01) | |
| *B32B 9/02* | (2006.01) | |
| *B32B 5/26* | (2006.01) | |

(52) U.S. Cl.
CPC ........... *A47G 9/0207* (2013.01); *D04H 13/00* (2013.01); *D06M 19/00* (2013.01); *B32B 5/04* (2013.01); *B32B 5/06* (2013.01); *B32B 5/26* (2013.01); *B32B 9/02* (2013.01); *B32B 9/047* (2013.01); *B32B 2250/40* (2013.01); *B32B 2262/0292* (2013.01); *B32B 2307/304* (2013.01); *B32B 2307/51* (2013.01); *B32B 2437/00* (2013.01)

(58) Field of Classification Search
USPC ............ 428/221, 297.1, 299.7, 300.4, 300.7, 428/317.1, 317.3, 317.7; 442/328, 329, 442/346, 381, 389
See application file for complete search history.

(56) References Cited

U.S. PATENT DOCUMENTS

| | | | | |
|---|---|---|---|---|
| 2,753,286 | A * | 7/1956 | Buchkremer | ............ D04H 3/00 428/114 |
| 5,624,729 | A * | 4/1997 | Cohen | ................... B32B 37/144 428/90 |
| 9,380,893 | B2 * | 7/2016 | Reuben | ................... B32B 5/022 |
| 2004/0043207 | A1 * | 3/2004 | Donovan | ................. D01F 8/18 428/304.4 |

(Continued)

*Primary Examiner* — Lynda Salvatore
(74) *Attorney, Agent, or Firm* — Guy J. Houle; Houle Patent Agency, Inc.

(57) ABSTRACT

A composite down feather sheet is comprised of an insulating core of down feathers bound together by a chemical binding agent or binding fibers or combination thereof. The core of down feathers is of substantially constant thickness and defines opposed flat faces to which is bonded a web of stretchable elastic adhesive. The method of fabricating the composite down insulating fabric sheet is also described as well as the method of bonding the composite down insulating fabric sheet to an outer shell fabric and a liner fabric to provide a composite sheet which facilitate the manufacture of down feather insulated fabric articles.

9 Claims, 3 Drawing Sheets

(56) References Cited

U.S. PATENT DOCUMENTS

| | | | |
|---|---|---|---|
| 2004/0126580 A1* | 7/2004 | Gaignard | D04H 1/02 428/373 |
| 2012/0328887 A1* | 12/2012 | Ryan | B27N 3/06 428/446 |
| 2018/0362329 A1* | 12/2018 | Reuben | A47G 9/10 |

* cited by examiner

COMPOSITE DOWN FEATHER SHEET WITH ELASTIC WEBS

TECHNICAL FIELD

The present invention relates to down insulation and more specifically to a composite down insulating sheet comprised of a down core layer having a stretchable elastic adhesive web bonded to opposed faces of the down core layer.

BACKGROUND OF THE INVENTION

In my U.S. Pat. No. 6,025,041 there is disclosed a down feather sheet of homogeneous form and wherein the down feathers are retained by a chemical binder. Such a sheet overcame the prior art problems of manipulating loose down feathers during the manufacture of fabric articles such as clothing, duvet covers, pillows, etc. In my most recently published US Patent Publication No. 20015/0196145-A1 published on Jul. 16, 2015 it is disclosed that there is a need to make the down feather sheet stretchable while preventing the escapement of the down feathers. Stretchable down is desirable in the manufacture of several insulated products where it is desirable to apply a pulling force on the insulation. Such stretchable down also has applications in the fabrication of certain articles of apparel. There is therefore disclosed the use of a dry binder and mixed with the down feathers which are deposited on an elastomeric sheet and when subjected to a heat treatment the binder melts or soften to bind the feathers and to the elastomeric sheet to form a stretchable down feather sheet.

When manufacturing fabric articles with down feather sheets, patterns are cut in the shell material and lining material as well as in the down feather sheet prior to assembly. It is important that these different material and insulation pieces be perfectly aligned prior to stitching and assembly to form the fabric article, and this is particularly so when fabricating articles of apparel. Often the fabric material sheets are given a stitching pattern in overlaid material sheets prior to the cutting of pattern pieces. This ads to costs as it is time consuming but it binds the material together in alignment when cutting the pattern pieces. It is also desirable that during use of the fabric article, and particularly articles of apparel, that the down be held firmly in place during such use. Because articles of apparel are usually washed and dried in washing and drying machines, the outer shell fabric, the down insulation and the lining fabric are subjected to all sorts of pulling forces and water infiltration. It is therefore desirable with articles of apparel which do not have stitch patterns to maintain the insulation firmly captive in the article of apparel between the opposed fabric walls to prevent strain on the down feather clusters which are bound together in the down sheet.

SUMMARY OF THE INVENTION

It is therefore a feature of the present invention to provide a composite down insulating feather sheet which overcomes the above mentioned disadvantages of the prior art.

Another feature of the present invention is to provide a composite down feather sheet which has a core of bound down feathers bonded between opposed fiber thin elastic adhesive webs.

Another feature of the present invention is to provide a composite down insulating feather sheet capable of bonding to opposed fabric sheets forming an article of fabric wherein the down insulating sheet is firmly secured to the opposed fabric sheets inside the article of fabric.

A further feature of the present invention is to provide a method of fabricating a composite down feather sheet wherein the down core has opposed elastic adhesive webs bonded to opposed surfaces thereof.

A still further feature of the present invention is to provide a method of fabricating down insulated composite fabric comprised of a composite down feather sheet bonded to a shell fabric sheet on one side and to a lining material on an opposed side by opposed adhesive webs bonded to the down feather core of the down feather sheet.

According to the above features, from a broad aspect, the present invention provides a composite down feather sheet comprised of an insulating core of down feathers bound together by a chemical binding agent. The core of down feathers is of substantially constant thickness and defines opposed flat faces. A web of elastic stretchable adhesive is bonded to at least one of the opposed flat faces of the core.

According to another broad aspect of the present invention there is provided a method of fabricating a composite down feather sheet. The method comprises conveying on a conveyor and under a mixing chamber a dry web of stretchable elastic adhesive from a roll of such web. Down feathers mixed with a binding agent are deposited on the web from a mixing chamber as the web is displaced by a conveyor whereby to deposit a core of down feathers of substantially constant thickness on the dry web of stretchable elastic adhesive. The elastic adhesive web with the core of down feathers mixed with the chemical binder is then conveyed through an oven set at a predetermined temperature to cause the chemical agent to bind to the down feathers and the web of stretchable elastic adhesive to bind to a bottom surface of the core of down feathers.

According to a further broad aspect of the present invention there is provided a method of fabricating down insulated composite fabric for the manufacture of fabric articles. The method comprises providing a down feather sheet having a core of down feathers bound together by a chemical binding agent. The sheet has a web of stretchable elastic adhesive bonded to opposed faces thereof. The down feather sheet is then conveyed between a shell fabric sheet and a sheet of lining material. The down feather sheet disposed between the shell fabric sheet and the lining material is then subjected to a heat treatment at a predetermined temperature to cause the webs of stretchable elastic material to melt and further bond to the shell fabric material and the lining material securing the core of down feathers therebetween to form the composite down insulated composite fabric sheet.

DESCRIPTION OF THE DRAWINGS

A preferred embodiment of the present invention will now be described with reference to the accompanying drawings in which.

DETAILED DESCRIPTION

Figure 1:
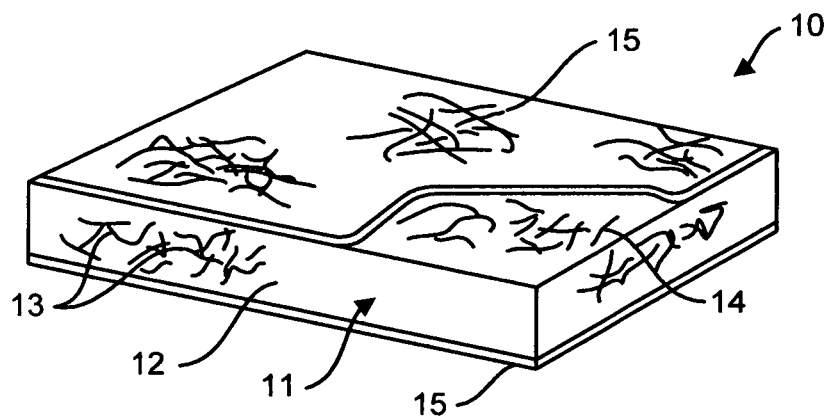
FIG. 1 is a perspective view illustrating the structure of the composite down feather sheet of the present invention.
Figure 2:
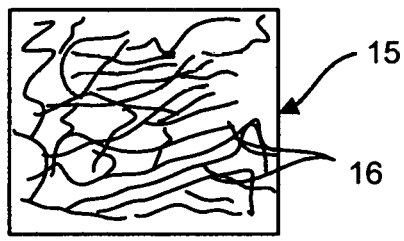
FIG. 2 is a plan view illustration of the composition of the elastic adhesive formed of interconnected polyurethane aliphatic fibers.

Referring now to the drawings, and more particularly to FIGS. 1 and 2, there is shown generally at 10 the composite down feather sheet of the present invention. It is comprised of an insulating core 11 of down feathers 12 bound together by a chemical binding agent 13 in powder form or fiber form or mixtures thereof. The core 11 is a homogeneous core of substantially constant thickness and defines opposed flat faces 14. A web 15 of stretchable elastic adhesive is bonded to each of the opposed flat faces 14 by heat treatment at specific temperatures.

As shown in FIG. 2, the web 15 of the stretchable adhesive is formed by polyurethane aliphatic fibers 16 bound together in a thin fiber film to form the thin webs 15. Such as web has multi-directional stretchability. Such a web is formed by random polyurethane fibers of random shape and is not a net of oriented stretchable fibers interconnected in a pattern with large openings between the interconnected fibers. It is a breathable homogeneous air permeable web. The thin web has a weight of between 12 gr/sq meters to 70 gr/sq meters. The fibers are white in coloration and the web exhibit transparency. Accordingly, it would not obstruct the coloration of colored down that may be used in articles of apparel or other fabric articles such as duvet covers, pillows, etc. where transparent sheeting or transparent patch areas are utilized in the design of the article.

An advantage of such a composite down feather sheet is that it can be heat bonded to other fabric materials preventing its displacement in fabric articles when in use and thereby providing uniform thermal insulation as well as preventing displacement of the internal down sheet by stretching the external material elastically bonded to the down sheet. It also eliminates friction between the external covering material and the down sheet which could dislodge down feathers on external surfaces of the down sheet. Of course, the composite down feather sheet may be bonded to other articles that requires thermal insulation. The composite down feather sheet is also stretchable permitting its securement to elastic materials or about curved articles where the insulation requires to be stretched and secured by heat, such as hot air blow guns.

Although in the preferred embodiment described and illustrated, a web of stretchable elastic material is bonded to opposed faces of the down feather sheet, for certain insulating applications the web may be bonded to only one face of the down heather sheet and the other face maintain free of any covering or have a different covering sheet such as a net to provide air flow through the down feathers. The stretchable elastic web provides for thermal connection of the insulating down feather sheet to all sorts of commercial or industrial products where this type of insulation is desirable, such as for example in the upholstery industry or construction industry, etc.

Figure 5:
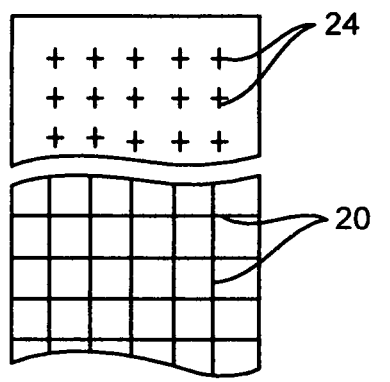
FIG. 5 is a fragmented section view illustrating the composition of the composite material insulating sheet for the manufacture of fabric articles.
Figure 5:
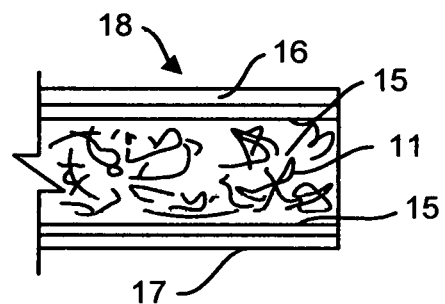
Figure 6:
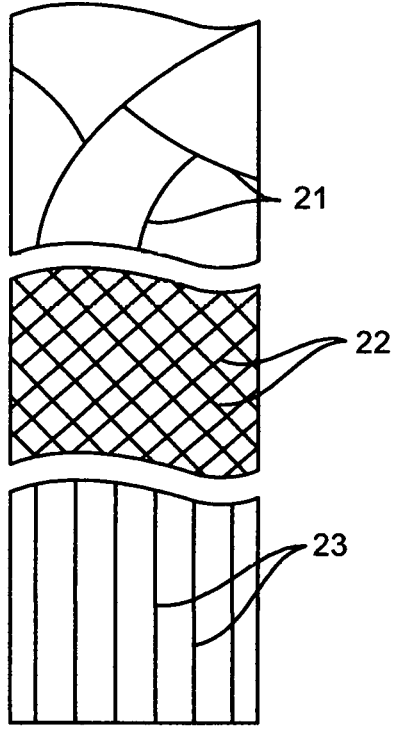
FIG. 6 is a fragmented plan view illustrating various stitch patterns that can be formed in the composite material insulating sheet for the manufacture of fabric articles.
Figure 7:
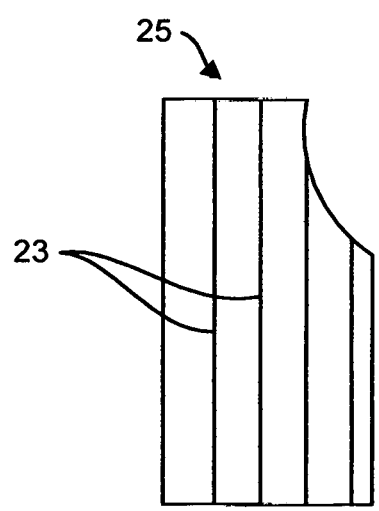
FIG. 7 is a cut pattern piece for an article of apparel and having a stitch pattern formed therein.

Because the down core is provided with opposed webs of stretchable elastic adhesive, this elastic adhesive can be activated to bind to fabric pieces or other type article by subjecting it to control heat in its softening to melting range of between 85 degrees C. to 115 degrees C. As shown in FIG. 5, for the fabrication of fabric articles, the down feather sheet can be bonded to an outer shell fabric material 16 and a lining fabric 17 to form a composite insulating material 18 ready to be pattern cut and assembled into an article of apparel, duvet cover, pillows, etc. As shown in FIG. 6, the laminated fabric sheet can also be supplied with stitch patterns such as the quilt stitch pattern 20 or a design pattern 21, a diagonal quilt 22, a line stitch pattern 23 or a simple tack stitch pattern 24. Accordingly, a garment manufacturer would need only to cut, for example, a jacket pattern 25 as shown in FIG. 7 with decorative line stitches already made and ready for assembly. Such greatly reduces the fabrication cost to the garment manufacturer. Another advantage to the garment manufacturer is that by maintaining supplies of such composite fabric that he could fabricate an article of apparel with different stitch patterns or mixed with non-stitch composite fabric. Alternatively, the ferment manufacturer can assemble the insulated core with the opposed stretchable elastic webs to any outer fabrics and heat bind them together before cutting pattern pieces or after the fabric pieces are cut. This would simply require the installation of a fusing oven and conveyor.

Figure 8A:
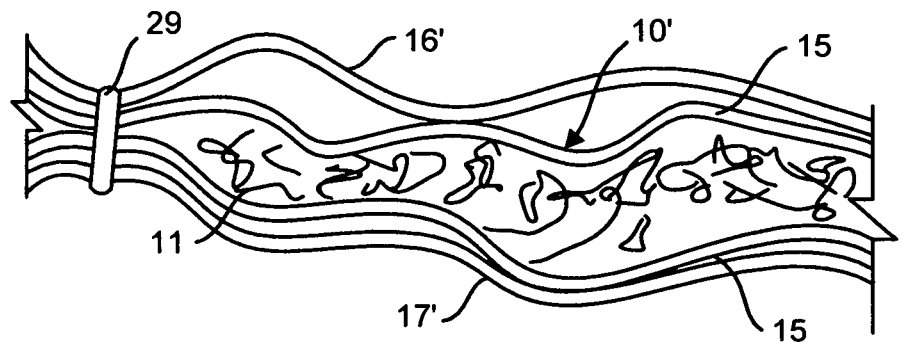
FIG. 8A is a fragmented section view illustrating a down insulated sheet which is not attached to a shell fabric sheet and a lining material sheet undergoing distortion.
Figure 8B:
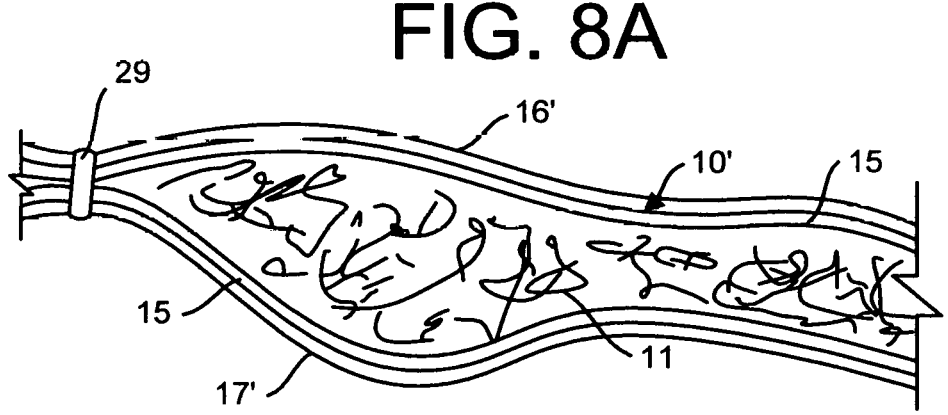
FIG. 8B is a view similar to FIG. 8A, but showing the down insulated sheet bonded to the shell fabric sheet and lining material sheet undergoing distortion.
Figure 9:
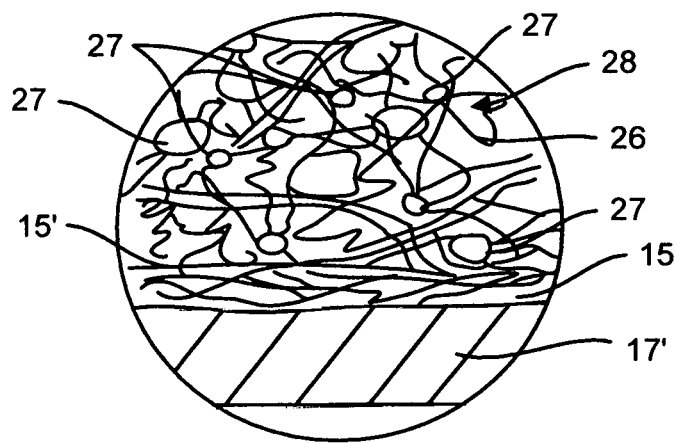
FIG. 9 is an enlarged microscopic view showing the bonded stretchable elastic adhesive web secured the feather clusters of the feather core.

Another advantage by having the down feather sheet 10 bonded to the outer shell fabric material 16 is illustrated in FIGS. 8A to 9. As shown in FIG. 8A, the down feather sheet 10' of the prior art is disposed in an article of apparel between a shell fabric material 16' and a lining material 17' and secured therebetween by peripheral stitch seams 29. Accordingly, the down feather sheet 10' is free to move between the shell fabric material 16' and the lining material 17' in non-stitched areas and is in frictional contact with the inner surfaces of the shell and lining fabric materials. Such distortion in the fabric of the article of apparel is particularly amplified during the washing and drying of the article of apparel in washing/*drying machines when the fabric is wet during washing and drying in washing/drying machines.

FIG. 8B illustrates the composite down insulated feather sheet 10 of the present invention as bonded to the inner surface of the shell fabric material 16' and the lining material 17' and as can be seen the down feather sheet 10' is no longer free to move between the shell fabric material 16' and the lining material 17' but moves therewith and stretches therewith eliminating friction and unnecessary wear during washing and drying.

FIG. 9 is an enlarged microscopic view showing the interconnection between the stretchable elastic adhesive web 15 and the down feather core and internal binder. As illustrated the down feather clusters 28 have a core 27 and down fibers 26 projecting from the core and intermingled with binders 28'. The feather clusters also attach to the inner surface 15' of the stretchable elastic adhesive 15 and are displaced with the flexible and stretchable elastic adhesive web when stretched in any direction as indicated by arrows 25.

The stretchable elastic adhesive web 15 herein utilized is manufactured by Protechnic, France, and is rated to have a wash resistance of up to about 90 degrees C. At washing temperatures the elastic adhesive will not melt but will remain attached to the fabric material and the core at its outer surface 15" as the temperatures of washing and drying machines are well below the softening point of 85 degrees C. of the web. Accordingly, the elastic adhesive webs prevent the core of down feathers from clumping during washing or drying wherein the article of apparel undergoes a tumbling and stretching action in hot wash water and dry heat. Therefore, as the fabric material stretches and/or or distorts during such washing and drying, the down insulation sheet follows the same displacement and remains intact.

Figure 3:
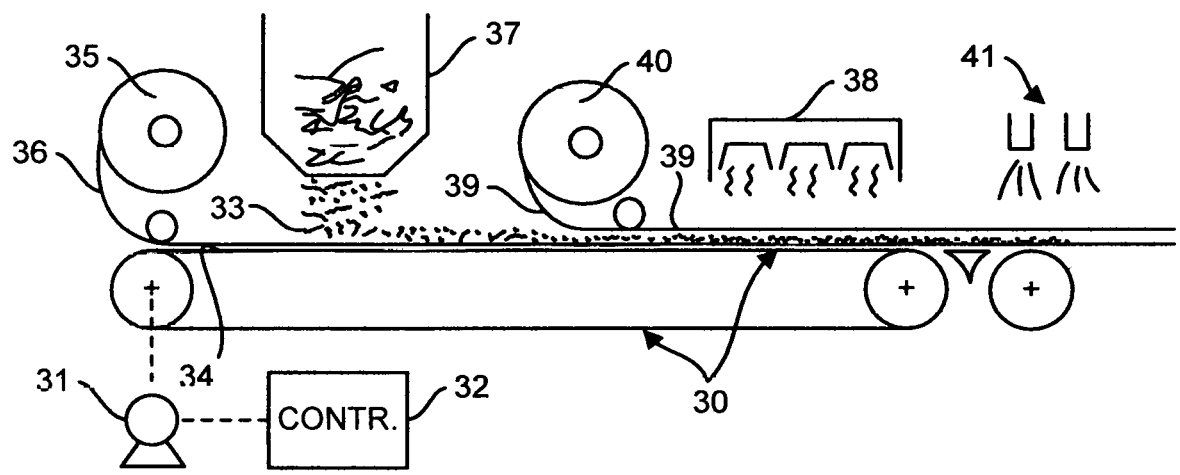
FIG. 3 is a simplified schematic illustration of the method of fabricating the composite down feather sheet of the present invention.

Referring now to FIG. 3, there will be described an example of the method of fabricating the composite down feather sheet 10 of the present invention. As herein illustrated in schematic form, a conveyor 30 is driven by a motor 31 which is controlled by a controller 32 to regulate the speed of the conveyor dependent on the desired thickness of the down feather mixture 33 to be deposited on a dry flexible elastic web 36 of elastic adhesive fed on the top run 34 of the conveyor 30 from a wed supply roll 35. As the web 36 of stretchable elastic adhesive is conveyed under the mixing chamber 37 a down feather mixture of predetermined thickness is deposited on the web 36 and conveyed to a next station. The next station may be an oven 38 where the web of stretchable elastic adhesive and the down feather mixture is subjected to a controlled heat treatment to bond the feathers mixed with a chemical binding agent or binding fibers together as well as bonding the down feather mixture to the web of stretchable elastic adhesive. The temperature of the oven is set at a desirable temperature in the range of from about 85 degrees C. to 115 degrees C. which is in the softening to melting point of the elastic adhesive and the down chemical binding agent. Accordingly, this results in a down insulating material deposited and adhered to a elastic adhesive backing web.

In a preferred embodiment, an additional elastic adhesive web 39 is fed from a roll 40 onto the top of the down feather mixture 33 before entering the oven 38 whereby to heat bond the down feather mixture between opposed stretchable elastic adhesive webs 36 and 39 to bind the down thereinbetween to form the composite down feather insulating fabric sheet 10. The composite down feather insulating sheet 10 leaving the oven 38 is then fed to a cooling station 41 where jets of cool air is projected against the composite down feather insulating sheet 10 from one or opposed sides thereof through a support mesh conveyor section or platform 42.

Figure 4:
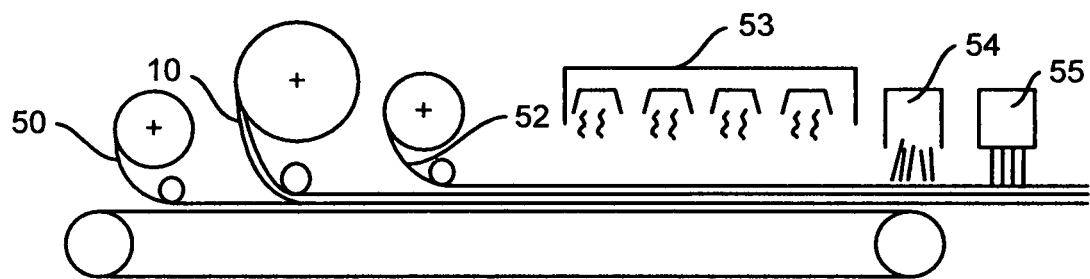
FIG. 4 is a further simplified schematic illustration of the method of fabricating the composite down insulating fabric sheet for the manufacture of fabric articles wherein the down insulation sheet is bonded to an outer shell fabric sheet and a lining material.

FIG. 4 illustrates further steps in the process for the production of a composite down insulating fabric sheet ready for use by a manufacture of fabric articles. These further process steps comprise feeding the composite down feather insulating sheet 10 onto a first fabric sheet 50 herein a lining material sheet disposed on a conveyor 51 and sandwiching the sheet 10 with a top fabric sheet 52 herein an outer shell fabric material. The bonded layers 50, 10 and 52 are then conveyed for a predetermined period of time into an oven 53 set at a temperature of between 85 degrees C. to 115 degrees C. to cause the stretchable elastic adhesive webs 50 and 52 to start softening and melting whereby to bond the down insulation core 11 of the composite down feather sheet 10 to opposed lining material sheet 50 and outer shell fabric sheet 52. The oven 53 may also be set at different temperatures from its entrance end to its exit end to progressively increase temperature to provide for controlled bonding of the elastic adhesive wed. This composite sheet is then conveyed to a cooling station 54 and a stitch pattern forming station, when required to form a stitch pattern material, to produce a roll of composite fabric insulating material ready for shipment to manufacturers for the construction of fabric articles.

It is within the ambit of the present invention to cover any obvious modifications of the embodiments described herein, provided such modifications fall within the scope of the appended claims.

The invention claimed is:

1. A light weight and pliable, thermally insulating, composite down feather sheet for use in articles of warmth comprising an insulating homogeneous core of down feathers bound together by a chemical binding agent; said chemical binding agent exhibiting, at least in part, elastic properties to constitute a stretchable insulating core of substantially constant thickness to provide uniform thermal insulation, said stretchable insulating core having opposed flat faces; and a fiber thin stretchable elastic adhesive web heat bonded to at least one of said opposed flat faces, said stretchable elastic adhesive web being a breathable homogeneous air permeable web, said stretchable elastic adhesive web having multi-directional stretchability and securing said at least one of said opposed flat faces of said core of down feathers to an inner surface of an outer fabric material shell of an article of warmth without any spaces between said at least one of said opposed flat faces of said core of down feathers and said inner surface of said outer material shell, said stretchable elastic adhesive web preventing movement and friction between said stretchable insulating core and said outer fabric material shell to permit said shell to be stretched and/or distorted and returned to its original shape due to said stretchable insulating core following the same stretching and distortion while said insulating core thereof remains intact.

2. The composite down feather sheet as claimed in claim 1 wherein there is a stretchable elastic adhesive web bonded to each of said opposed flat faces.

3. The composite down feather sheet as claimed in claim 1 wherein said stretchable elastic adhesive web is formed of polyurethane aliphatic fibers to provide said multi-directional stretchability, said fibers being white fibers to produce a substantially transparent stretchable elastic adhesive web having a weight of between 12 to 70 grams per meter square.

4. The composite down feather sheet as claimed in claim 2 wherein said stretchable elastic adhesive web is heat bonded to said opposed flat faces by subjecting said core of down feathers and opposed stretchable elastic adhesive webs to a heat treatment in the range of about 85 degrees C. to 115 degrees C. for a predetermined time.

5. The composite down feather sheet as claimed in claim 2 wherein said outer material shell is bonded onto an outer one of said stretchable elastic adhesive web, and a lining fabric material bonded onto an inner one of said stretchable elastic adhesive web to form a composite material insulating sheet for the manufacture of fabric articles.

6. The composite down feather sheet as claimed in claim 5 wherein said composite material sheet has a stitching pattern formed therein.

7. The composite down feather sheet as claimed in claim 5 wherein said composite material insulating sheet is cut in patterns with said core of down feathers remaining captive between said outer shell and lining fabric by said opposed stretchable elastic adhesive webs binding said insulating core of down feathers to said shell fabric material and to said lining fabric material.

8. The composite down feather sheet as claimed in claim 1 wherein said stretchable elastic adhesive web has a softening point of 85 degrees C. and a melting point in the range of from about 90 degrees C. to 115 degrees C. for a predetermined time.

9. The composite down feather sheet as claimed in claim 1 wherein said stretchable elastic adhesive web has a wash resistance of up to about 90 degrees C. to prevent said core of said down feathers, when in an article of apparel, from clumping during washing in a washing machine or drying when in a drying machine undergoing tumbling.

* * * * *